United States Patent [19] [11] 4,073,615
Lacroix et al. [45] Feb. 14, 1978

[54] STABLE DYE SOLUTION

[75] Inventors: Roger Lacroix, Huningue, France; Roland Haberli, Wurenlingen, Switzerland

[73] Assignee: Ciba-Geigy Corporation, Ardsley, N.Y.

[21] Appl. No.: 739,407

[22] Filed: Nov. 8, 1976

[30] Foreign Application Priority Data

Nov. 12, 1975 Switzerland ............... 14652/75

[51] Int. Cl.² ............................................. D06P 1/00
[52] U.S. Cl. ............................................. 8/25; 8/26; 8/39 R; 8/41 R; 8/76; 8/79; 8/85 A; 8/93; 8/172 R; 106/22; 8/178 R
[58] Field of Search .............. 8/25, 26, 39 R, 41 R, 8/76, 85 A, 93, 178 R, 172 R; 106/22

[56] References Cited

U.S. PATENT DOCUMENTS

| | | | |
|---|---|---|---|
| 2,773,056 | 12/1956 | Helfaer | 260/208 |
| 3,406,162 | 10/1968 | Neier | 260/145 |
| 3,989,452 | 11/1976 | Hugelshofer | 8/42 R |
| 4,005,066 | 1/1977 | Gottschalk et al. | 260/145 A |

FOREIGN PATENT DOCUMENTS

| | | |
|---|---|---|
| 1,551,772 | 12/1968 | France. |
| 2,335,512 | 1/1974 | Germany. |
| 2,209,478 | 9/1973 | Germany. |
| 1,260,652 | 2/1968 | Germany. |
| 7,204,084 | 10/1972 | Netherlands. |
| 1,457,412 | 12/1976 | United Kingdom. |

*Primary Examiner*—A. Lionel Clingman
*Attorney, Agent, or Firm*—Edward McC. Roberts; Prabodh I. Almaula

[57] ABSTRACT

A stable dye solution which has a high concentration of dye and which is miscible with water in any proportion, is described which dye solution contains
 a. 20 to 40 percent by weight of at least one azo, nitro or anthraquinone dye containing acid groups, in particular sulphonic acid groups,
 b. 20 to 80 percent by weight of N-cyclohexylpyrrolidone,
 c. optionally 0.1 to 20 percent by weight of water, and
 d. optionally 0.1 to 50 percent by weight of a glycol or glycol ether or of a mixture thereof,
as well as, optionally, further additives; the said dye solution is suitable in particular for the continuous dyeing of carpets.

10 Claims, No Drawings

STABLE DYE SOLUTION

The invention relates to a stable dye solution of acid dyes, which is miscible with water in any proportion, to processes for producing this dye solution, as well as to its use for the preparation of dye baths and printing pastes for dyeing and printing of, in particular, textile materials.

Many dyes are put on the market usually in the form of dried and finely ground powders, which have to be dissolved or dispersed for dyeing in the dye bath. This form of application has however considerable disadvantages. Apart from the unpleasant release of dust caused by the weighing, transferring or charging of the deeply coloured dye powders, and the risk of the finely ground dye powders becoming caked together due to the action of moisture or heat resulting from incorrect storage, the dissolving or dispersing of the powders in the dye bath gives rise to considerable difficulties since the dyes in most cases are insufficiently soluble in water, particularly when high dye concentrations are required, such as are necessary, e.g., for continuous dyeing or for printing. If it is not possible to get the undissolved dye constituents of a padding liquor or of a printing paste into an adequately fine dispersion, irregular and skittery dyeings and printings are obtained.

It has therefore already been suggested that dyes, for example acid dyes, be used in the form of concentrated solutions. It is possible in this way to avoid certain disadvantages, such as the generation of dust and the dissolving difficulties, associated with the use of dye powders.

From DOS 2,335,512 is thus known a dye solution which contains at least one azo, nitro or anthraquinone dye, each containing sulphonic acid groups, dissolved in a solvent mixture that is miscible in any proportion with water and consists of an aprotic solvent, a glycol and, optionally, water.

It has now been found on the one hand that with the use of N-cyclohexylpyrrolidone as an aprotic solvent, this can be employed on its own as solvent and not necessarily in combination with a glycol; and on the other hand that in the case of other organic solvents present, these can be at least partially replaced by water.

Surprisingly, as a result of the application of N-cyclohexylpyrrolidone, the capacity of the dye solution to be diluted with water is improved, and furthermore the diluted solution — also in the acid pH range — is more stable. The consequence of this is that such a solution can be used particularly in the continuous dyeing of carpets.

The invention thus concerns a dye solution which consists essentially of
 a. 20 to 40 percent by weight of at least one azo, nitro or anthraquinone dye containing acid groups, in particular sulphonic acid groups,
 b. 20 to 80 percent by weight of N-cyclohexylpyrrolidone,
 c. optionally 0.1 to 20 percent by weight of water, and
 d. optionally 0.1 to 50 percent by weight of a glycol or glycol ether or of a mixture thereof.

An especially preferred dye solution is composed of:
 a. 25 to 35 percent by weight of an azo, nitro or anthraquinone dye containing sulphonic acid groups,
 b. 20 to 30 percent by weight of N-cyclohexylpyrrolidone,
 c. 0.1 to 10 percent by weight of water, and
 d. 30 to 50 percent by weight of a glycol or glycol ether.

The dye solutions according to the invention are highly fluid, have a pH value of about 6 to 8, have a high concentration of dye, are miscible with water in any proportion, are storage-stable over 3 to 4 months and are temperature-stable from −20° C to +50° C.

The azo, nitro and anthraquinone dyes containing acid groups, in particular sulphonic acid groups, can according to the invention be present in the dye solution in the form of the free sulphonic acid, advantageously however in the form of their metal salts, e.g. sodium, potassium or magnesium salts.

Azo dyes containing sulphonic acid groups are, for example, disazo dyes, particularly however monoazo dyes which belong, e.g., to the following classes: benzene-azobenzene, benzene-azo-naphthalene, naphthalene-azo-naphthalene, benzene-azo-pyrazolone, benzene-azo-aminopyrazole, benzene-azo-acetoacetic acid amide, benzene-azobenzene-azobenzene, benzene-azo-naphthalene-azo-benzene or benzene-azo-benzene-azo-naphthalene; and which can contain further substituents such as amino, hydroxy, alkylsulphonyl, arylsulphonyl, alkyl or alkoxy groups having 1 to 6 carbon atoms, halogen atoms such as chlorine, bromine or fluorine, or nitro groups.

As acid nitro dyes are mentioned in particular nitrophenylamine compounds which can contain further substituents, e.g. amino groups.

The anthraquinone dyes from a colouristic point of view can belong to the most diverse classes. Of interest from a chemical point of view are in particular the 1-amino-4-arylamino-anthraquinones.

Suitable glycols or glycol ethers optionally usable according to the invention are those which are miscible with water in any proportion. Examples of these are: ethylene glycol, 1,2-propylene glycol, diethylene, glycol, triethylene glycol and tetraethylene glycol, 2-methylpentanediol-3,4, ethylene glycol monomethyl ether, ethylene glycol monoethyl ether or ethylene glycol mono-n-butyl ether, diethylene glycol monomethyl ether, diethylene glycol monoethyl ether or diethylene glycol monobutyl ether, diethylene glycol monoethyl ether acetate, triethylene glycol monobutyl ether, tetraethylene glycol dimethyl ether dipropylene glycol, glycerin, glycerin-1,3-diethyl ether or thiodiglycol.

Of the glycols or glycol ethers mentioned, which may also be used mixed with or among each other, those preferably employed are tetraethylene glycol, diethylene glycol monomethyl ether and tetraethylene glycol dimethyl ether.

To the dye solutions according to the invention can also be added water-soluble additives for improving properties, such as anti-foaming agents or dispersing agents.

The dye solutions according to the invention are obtained by mixing the commercial dye or pure dye as defined, preferably in the dried powder form, into N-cyclohexylpyrrolidone, optionally in the presence of water and/or of a glycol or glycol ether, at a temperature of about 20 to 60° C, and stirring until the solution is homogeneous. The solution temperature and the time required to obtain the solution depend on the employed dye and on the solvents. Both values can be easily determined by preliminary tests.

The insoluble constituents, such as inorganic salts, impurities, etc., are if necessary filtered off to finally obtain the homogeneous dye solution according to the invention.

By virtue of the existence of a solution, the danger, often present in the case of dispersions, of flocculation and sedimentation is avoided.

The dye solution according to the invention is miscible with water in any proportion, without precipitation of the dye, and can be easily volumetrically measured out, irrespective of whether it is diluted with water or is poured into water. The adding of the dye solution according to the invention to the liquor can be carried out even at room temperature without any risk of lumps being formed. In the case of dye preparations in powder form, however, it is frequently necessary, before addition of the dye to the dye bath, to prepare a stock solution at elevated temperature in water, in order to ensure that the dyes are completely dissolved or dispersed in the dye bath.

Before its subsequent use, the dye solution according to the invention has to be diluted with water approximately in the ratio of 1:10 to 1:50, i.e. 1 part of dye solution and 10 to 50 parts of water.

A dye solution of this kind is used, in particular, for the preparation of a dye bath, or, before dilution with water and after the addition of suitable thickening agents, for the preparation of aqueous, organic-aqueous or pure organic printing inks.

In continuous dyeing, the use of highly concentrated dye solutions extraordinarily simplifies the preparation of padding liquors. A particular requirement in this respect is that these padding liquors should be stable, a requirement which the dye solution according to the invention, after dilution with water, satisfies. This is especially of advantage when, for example, floor coverings of polyamide fibre material, such as tufted carpets, are being continuously dyed in long lengths, with several cubic meters of padding liquor being required for each batch.

Thus the dye solution according to the invention is suitable, in particular, for the continuous dyeing of carpets. It can however be used for other purposes, e.g. for producing dye baths for the continuous and discontinuous process applicable to textile materials which are dyeable with acid dyes. Furthermore, such a dye solution can be used to produce inks or printing inks for recording instruments, stamp pads and typewriter ribbons.

In the following Examples which illustrate the invention without its scope being limited to them, parts are by weight, except where otherwise stated, and temperatures are in degrees Centigrade.

EXAMPLE 1

A storage-stable solution is obtained by introducing 35 parts of the salt-containing dye powder of the formula

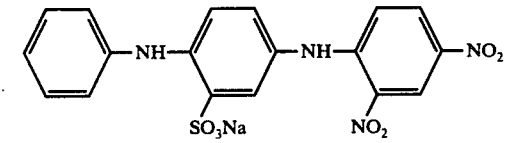

into a mixture of 25 parts of N-cyclohexylpyrrolidone, 10 parts of water and 30 parts of tetraethylene glycol dimethyl ether at 60° while stirring is maintained.

The solution is then further stirred for 1 hour at room temperature, and subsequently filtered off from the residue remaining. The dye does not crystallise out from the resulting solution even after 3 months at temperatures of −20, 25 and 50°. If the dye solution is poured into water, a homogeneous dispersion occurs instantly.

The colouristic properties of the solution are better than those of the corresponding standardized dye-powder type.

EXAMPLE 2

31 parts of the dry salt-containing dye of the formula

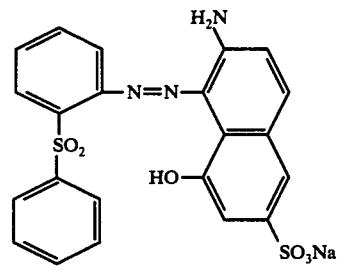

are introduced at room temperature into a mixture of 20 parts of N-cyclohexyl-2-pyrrolidone and 49 parts of diethylene glycol monomethyl ether. The mixture is stirred during one hour at room temperature. The dye goes into solution and the solution is subsequently filtered. On filtration, practically no residue remains on the filter. The resulting solution is highly fluid, storage-stable, miscible with water in any proportion and, in its diluted form, is characterised by a particularly good stability in storage. It is very suitable for the continuous dyeing of carpets.

EXAMPLE 3

25 parts of the salt-containing dye powder of the formula

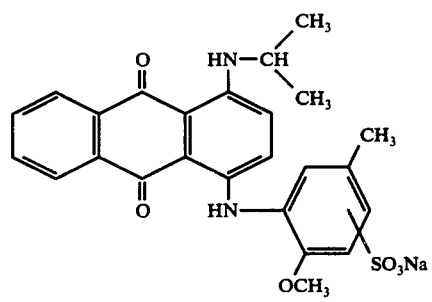

are dissolved, by stirring, in a mixture of 10 parts of water, 25 parts of N-cyclohexyl-2-pyrrolidone and 40 parts of tetraethylene glycol at room temperature. The mixture is further stirred for one hour, and the undissolved (salt) is then removed by filtration. The solution obtained is storage-stable and, if diluted with water, remains stable.

EXAMPLE 4

25 parts of the salt-containing dye powder according to Example 3 are dissolved by stirring at room temperature in 75 parts of N-cyclohexyl-2-pyrrolidone. The mixture is stirred for a further hour, and then separated by filtration from the undissolved (salt). The solution obtained is storage-stable and, if diluted with water, remains stable.

EXAMPLE 5

28 parts of the salt-containing dye powder of the formula

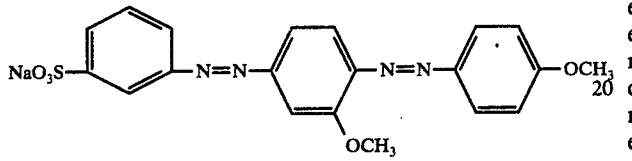

are dissolved by stirring in a mixture of 10 parts of water, 20 parts of N-cyclohexylpyrrolidone and 42 parts of tetraethylene glycol at a temperature of about 40 to 50°. The mixture is stirred for a further hour, and is then separated by filtration from the undissolved (salt). The solution obtained is storage-stable and, when diluted with water, remains stable.

We claim:

1. Stable dye solution which has a high concentration of dye and is miscible with water in any proportion, which dye solution contains
   a. 20 to 40 percent by weight of at least one azo, nitro or anthraquinone dye containing an acid group and,
   b. 20 to 80 percent by weight of N-cyclohexylpyrrolidone.

2. Dye solution according to claim 1, which contains at least one monoazo dye or nitro dye containing one sulphonic acid group.

3. Dye solution according to claim 1, which contains as anthraquinone dye a 1-amino-4-arylaminoanthraquinone dye.

4. Dye solution according to claim 1, further containing 0.1 to 20% by weight of water.

5. Dye solution according to claim 1, further containing 0.1 to 50% by weight of a glycol or glycol ether or mixture thereof.

6. Dye solution according to claim 4, further containing 0.1 to 50% by weight of a glycol or glycol ether or mixture thereof.

7. Dye solution according to claim 5, which contains as glycol: ethylene glycol, diethylene glycol, triethylene glycol or tetraethylene glycol; or as glycol ether: ethylene glycol monomethyl ether, ethylene glycol monoethyl ether, diethylene glycol monomethyl ether, diethylene glycol monoethyl ether, diethylene glycol mono-n-butyl ether or tetraethylene glycol dimethyl ether.

8. Dye solution according to claim 6, which contains:
   a. 25 to 35 percent by weight of an azo, nitro or anthraquinone dye containing a sulphonic acid group,
   b. 20 to 30 percent by weight of N-cyclohexylpyrrolidone,
   c. 0.1 to 10 percent by weight of water, and
   d. 30 to 50 percent by weight of a glycol or glycol ether.

9. Process for producing a dye solution according to claim 1, which process comprises mixing an acid azo, nitro or anthraquinone dye, in the dried powder form, into N-cyclohexylpyrrolidone, and 0 to 50 percent by weight of glycol or glycol ether, at a temperature of about 20 to 60° C, and stirring until the solution is homogeneous.

10. The process of dyeing or printing polyamide textiles with a dye bath or printing ink which comprises the dye solution of claim 1.

* * * * *